(12) United States Patent
Yoshikawa et al.

(10) Patent No.: US 8,161,606 B2
(45) Date of Patent: Apr. 24, 2012

(54) FIBER BUNDLE ARRANGING APPARATUS

(75) Inventors: Genki Yoshikawa, Kariya (JP); Junji Takeuchi, Kariya (JP); Yoshiharu Yasui, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 514 days.

(21) Appl. No.: 12/443,387

(22) PCT Filed: Apr. 24, 2008

(86) PCT No.: PCT/JP2008/057947
§ 371 (c)(1),
(2), (4) Date: Mar. 27, 2009

(87) PCT Pub. No.: WO2008/139881
PCT Pub. Date: Nov. 20, 2008

(65) Prior Publication Data
US 2010/0071177 A1    Mar. 25, 2010

(30) Foreign Application Priority Data
May 11, 2007  (JP) .................................. 2007-126453

(51) Int. Cl.
*D04H 3/04* (2012.01)
(52) U.S. Cl. .......................................... 28/100; 28/102
(58) Field of Classification Search .................... 28/100, 28/101, 102, 140, 172.1, 208, 248, 250, 257, 28/271, 273; 264/172.19, 177.13; 156/441, 156/180, 181; 19/299
See application file for complete search history.

(56) References Cited

U.S. PATENT DOCUMENTS

| | | | | |
|---|---|---|---|---|
| 4,880,177 A * | 11/1989 | Lenk et al. | .................. | 242/365.1 |
| 5,318,328 A * | 6/1994 | Dawson | .................. | 285/9.1 |
| 5,467,513 A * | 11/1995 | Steiner et al. | .................. | 28/281 |
| 5,475,907 A * | 12/1995 | Hoover | .................. | 28/219 |
| 5,560,225 A * | 10/1996 | Salucci | .................. | 66/149 S |
| 5,590,515 A * | 1/1997 | Boden | .................. | 57/264 |
| 5,704,203 A * | 1/1998 | Koltze et al. | .................. | 57/76 |
| 5,943,748 A * | 8/1999 | Steiner et al. | .................. | 28/221 |

FOREIGN PATENT DOCUMENTS

| | | |
|---|---|---|
| JP | 59-136292 | 9/1984 |
| JP | 61-89492 U | 6/1986 |

(Continued)

OTHER PUBLICATIONS

International Preliminary Report on Patentability for corresponding PCT Application No. PCT/JP2008/057947.

*Primary Examiner* — Amy B. Vanatta
(74) *Attorney, Agent, or Firm* — Locke Lord LLP

(57) ABSTRACT

A cylinder 40 made of a magnetic material is fixed to an introduction pipe 34. An annular connection projection 401 is provided on the cylinder 40 and a disk 42 is connected to the connection projection 401 with an annular permanent magnet 43. The permanent magnet 43 is fixed to the disk 42 and connected to a distal end surface of the connection projection 401 by a magnetic force. A guide pipe 31 is fixed to the disk 42. The guide pipe 31 and the introduction pipe 34 are connected to each other in series by a connection portion 49 having the cylinder 40, the permanent magnet 43, and the disk 42. A fiber bundle F that is guided via a guide roller 33 is fed to an introduction hole 341 and a guide hole 311.

6 Claims, 6 Drawing Sheets

FOREIGN PATENT DOCUMENTS

| | | |
|---|---|---|
| JP | 63-270922 | 11/1988 |
| JP | 5-220691 | 8/1993 |
| JP | 2000-108212 | 4/2000 |
| JP | 2000-199151 * | 7/2000 |
| JP | 2004-256943 | 9/2004 |
| JP | 2007-16347 | 1/2007 |

* cited by examiner

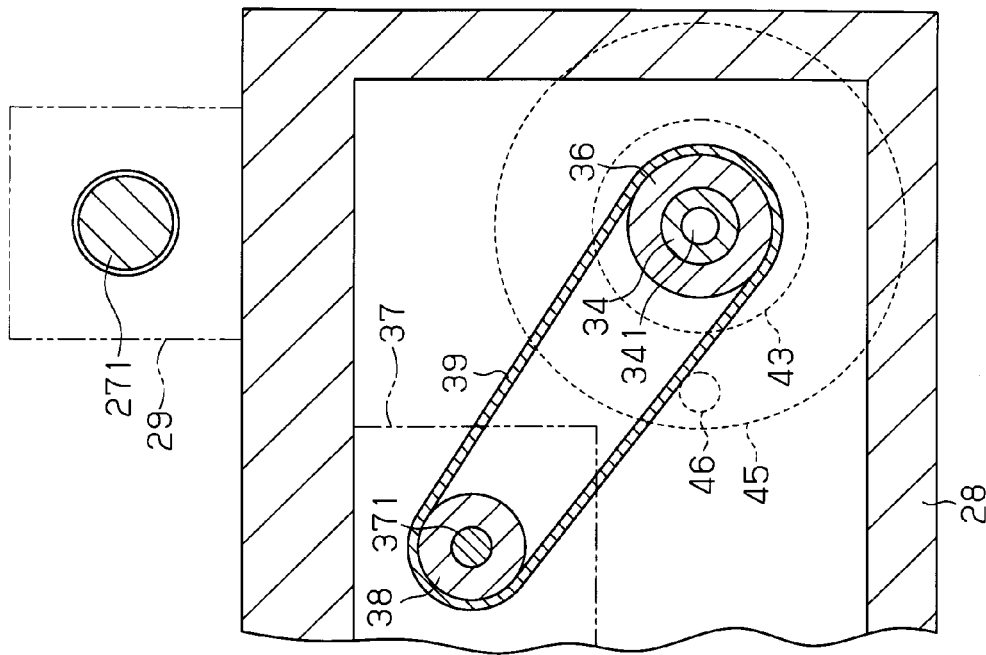
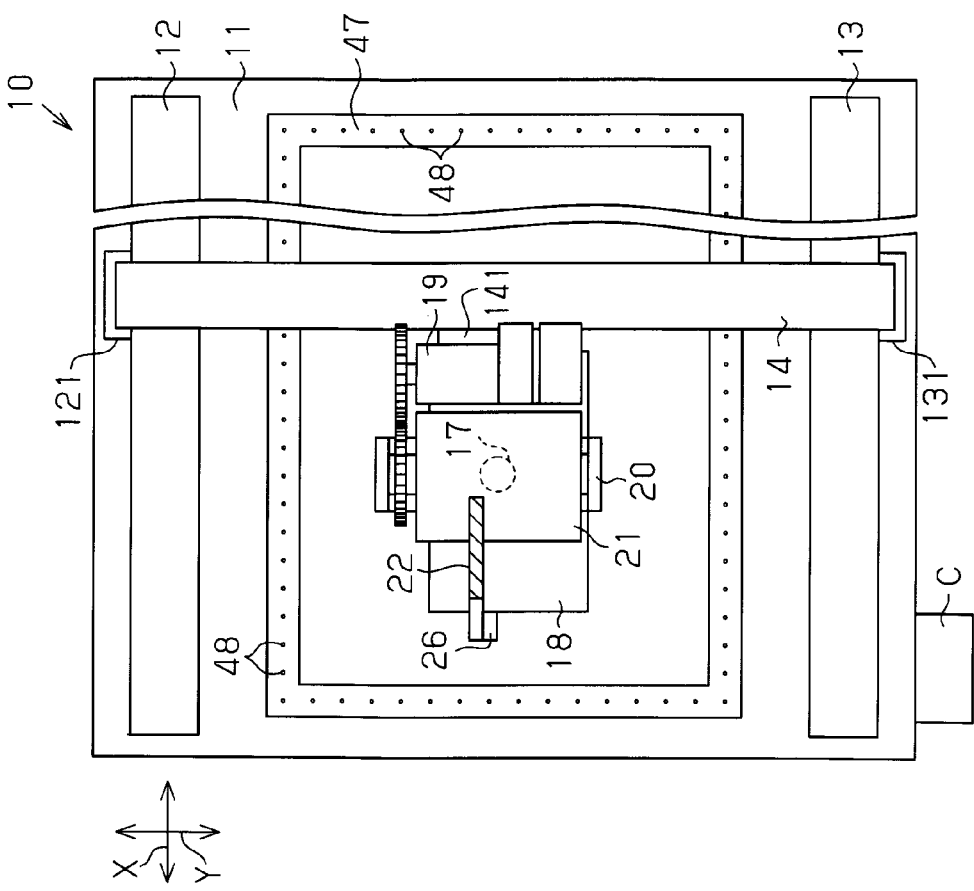
Fig.2(a)
Fig.2(b)

Fig.4
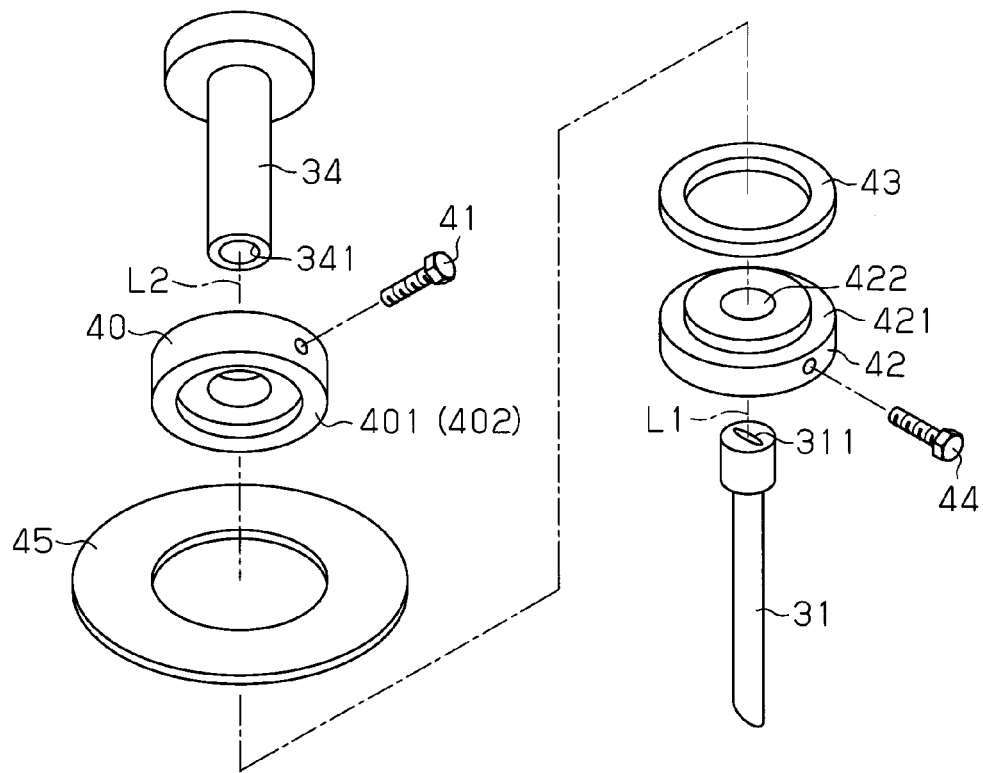
Fig.5(a)
Fig.5(b)
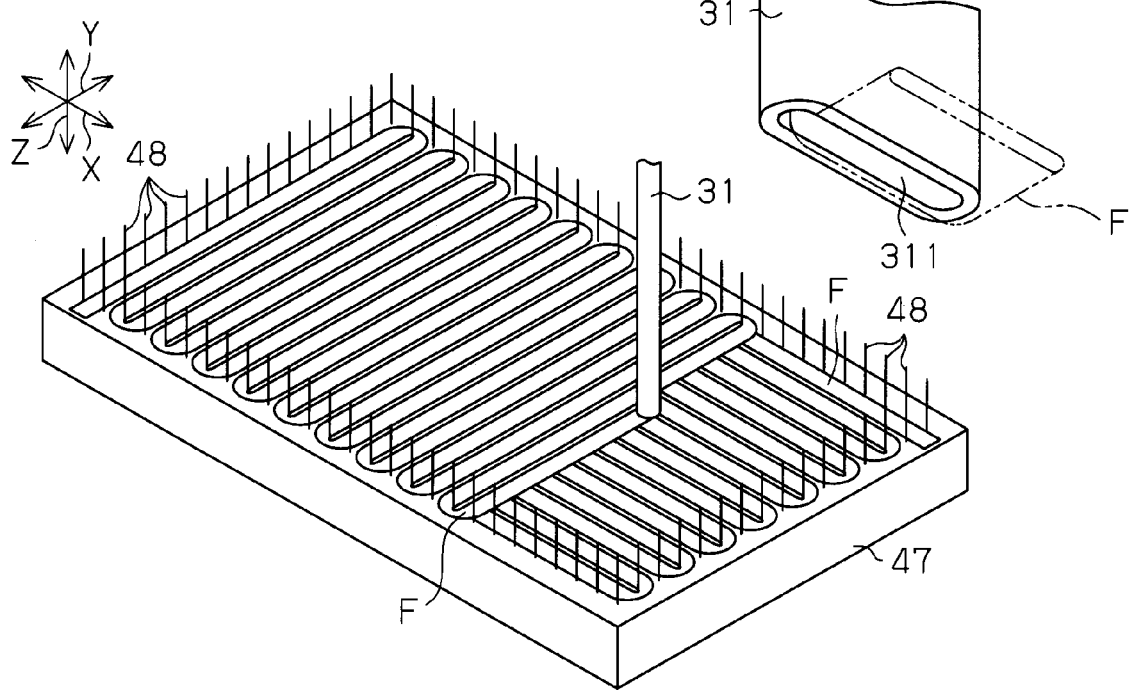

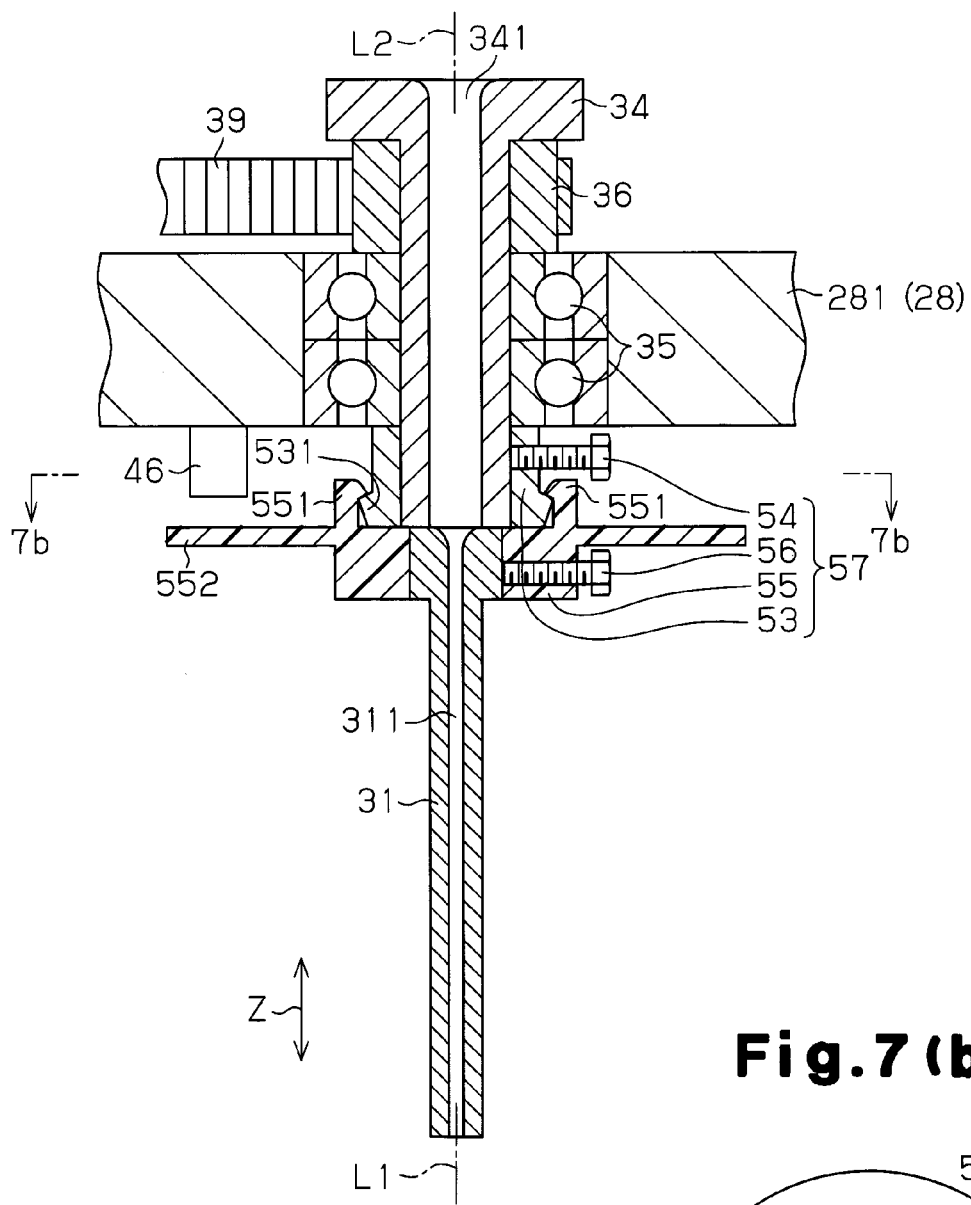
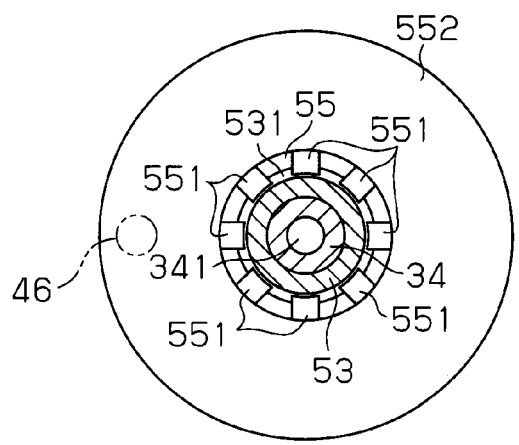

FIBER BUNDLE ARRANGING APPARATUS

FIELD OF THE INVENTION

The present invention relates to a fiber bundle arranging apparatus that has a guide pipe having a guide hole, through which a fiber bundle passes, and a moving device that moves the guide pipe, and particularly to a fiber bundle arranging apparatus that moves the guide pipe so as to arrange the fiber bundle by pulling out the fiber bundle from the guide hole.

BACKGROUND OF THE INVENTION

Conventionally, there have been fiber reinforced composite materials that contain a three-dimensional fabric (three-dimensional fiber structure) as a fiber reinforced composite material, which is widely used as a light structural material. The fiber reinforced composite material has great strength and is used as a structural material of an airplane. There has been a following manufacturing method of the three-dimensional fiber structure that is used for a reinforcing material of the fiber reinforced composite material. A plurality of fiber bundle layers, in each of which the fiber bundles are arranged so as to be folded back, are stacked so as to form a stacked fiber bundle group that has at least biaxial orientation. The fiber bundle layers of the stacked fiber bundle group are connected to each other by connection yarns which are arranged along a direction perpendicular to each fiber bundle layer. Patent Document 1 discloses a fiber bundle arranging apparatus, in which, while a fiber bundle is let out from a guide pipe that moves along an arrangement surface, each fiber bundle is arranged in a flat state between pins that are arranged by a predetermined pitch and each fiber bundle is arranged to be folded back such that the flat surface of the fiber bundle lies along the arrangement surface to form a fiber bundle layer. Connection yarns are inserted to the stacked fiber bundle group that is formed by stacking a plurality of fiber bundles after the stacked fiber bundle group is removed from the fiber bundle arranging apparatus.

Patent Document 2 discloses an apparatus that inserts connection yarns to the stacked fiber bundle group. The apparatus disclosed in Patent Document 2 has a mechanism that inserts a retaining thread that prevents the inserted connection yarns from coming off the stacked fiber bundle group. A needle for receiving the retaining thread is engaged with a power transmission portion of a device that drives the needle for receiving the retaining thread via a damper. The power transmission portion is connected to a belt that reciprocates. When the belt reciprocates, an insertion operation (reciprocating operation) of the needle for receiving the retaining thread is executed. When the needle for receiving the retaining thread contacts a needle for receiving connection yarns or the connection yarns, an extraordinary load may be applied to the needle for receiving the retaining thread.

The damper, for example, includes a cylinder. A distal end of a plunger of the cylinder is engaged with a recess formed at a proximal end of the needle for receiving the retaining thread. If an extraordinary load is applied to the reciprocating needle for receiving the retaining thread, the distal end of the plunger is disengaged from the recess. This prevents damage of the needle for receiving the connection yarns or the needle for receiving the retaining thread.

When the guide pipe of the fiber bundle arranging apparatus moves, the guide pipe may be caught on the arranged fiber bundle, or the guide pipe may contact the pin, or an extraordinary tensile force may be applied to the fiber bundle that is being let out from the guide pipe. In this case, the guide pipe may be damaged. However, neither one of Patent Document 1 nor 2 discloses means for preventing the above problems.

Patent Document 1: Japanese Laid-Open Patent Publication No. 2007-16347
Patent Document 2: Japanese Laid-Open Patent Publication No. 2004-256943

SUMMARY OF THE INVENTION

An objective of the present invention is to prevent a guide pipe from being damaged.

To achieve the above objective, the present invention provides a fiber bundle arranging apparatus comprising a guide pipe having a guide hole for passing a fiber bundle therethrough, a moving device for moving the guide pipe so as to drawing the fiber bundle from the guide hole and arranging the fiber bundle, a movable portion that is moved by the moving device, and a separable connection portion for connecting the guide pipe to the movable portion.

BRIEF DESCRIPTION OF THE DRAWINGS

FIG. 2(a) is a cross-sectional plan view showing the fiber bundle arranging apparatus of FIG. 1(a);
FIG. 2(b) is a cross-sectional view taken along line 2b-2b of FIG. 1(b);
FIG. 4 is an exploded perspective view showing an arrangement head;
FIG. 5(a) is a perspective view showing an arrangement of the fiber bundles;
FIG. 5(b) is a partially enlarged perspective view showing a guide pipe;
FIG. 7 (a) is a partially enlarged cross-sectional view showing a fiber bundle arranging apparatus according to a third embodiment of the present invention;
and
FIG. 7(b) is a cross-sectional view taken along line 7b-7b of FIG. 7(a).

DETAILED DESCRIPTION OF THE PREFERRED EMBODIMENTS

Figure 1:
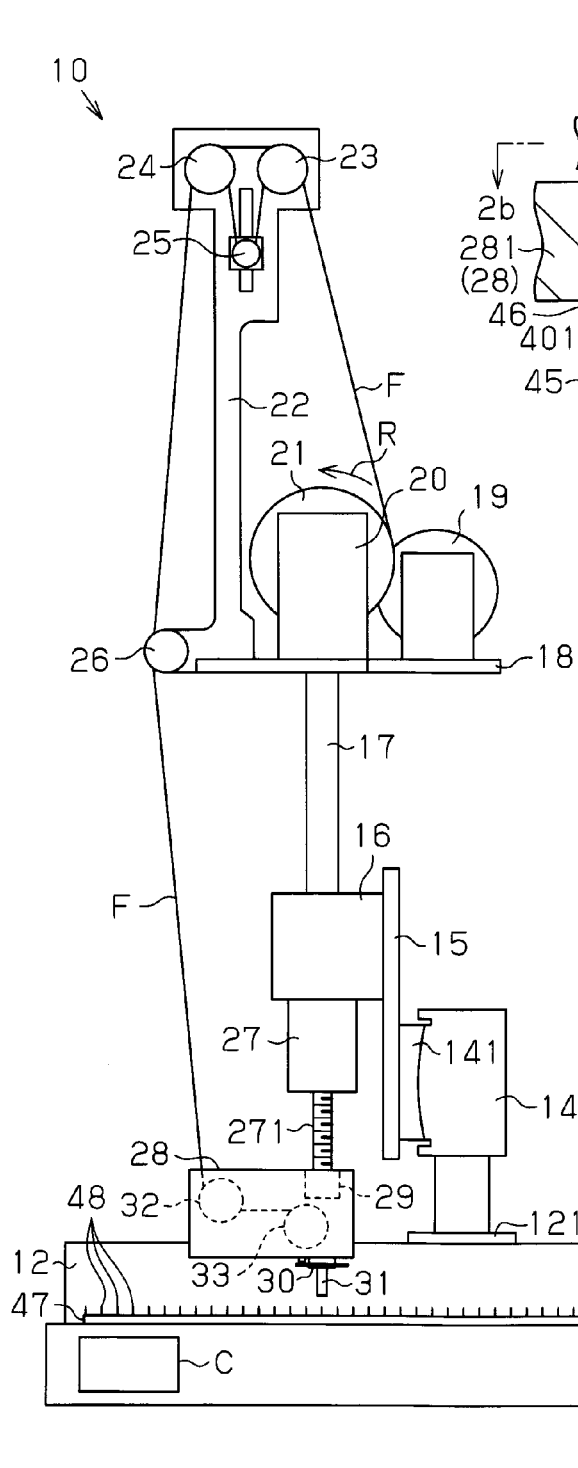
FIG. 1(a) is a side view for showing a fiber bundle arranging apparatus according to a first embodiment of the present invention.
FIG. 1(b) is a partially enlarged cross-sectional view of FIG. 1(a)
Figure 1:
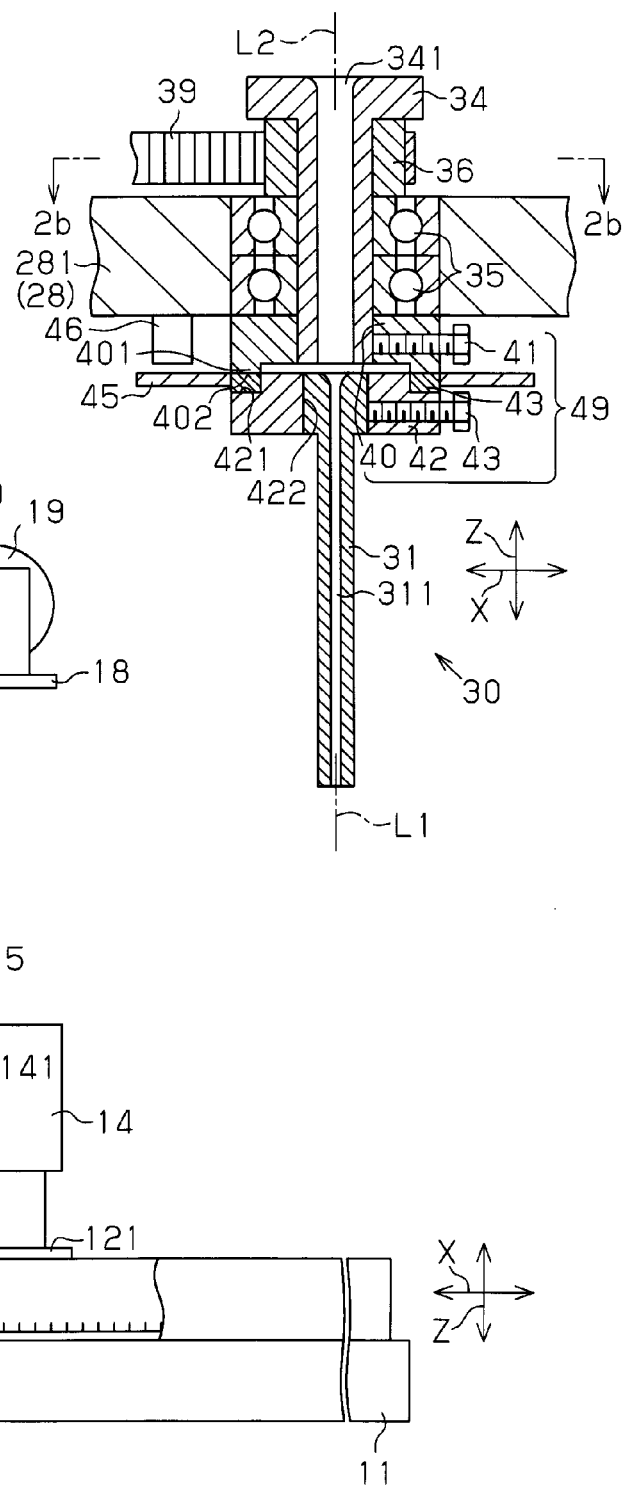

A first embodiment of the present invention will now be described with reference to FIGS. 1 to 5. FIG. 1(a) shows a whole fiber bundle arranging apparatus 10 according to the present embodiment.

As shown in FIG. 2(a), a pair of linear sliders 12, 13 are provided on a rectangular base 11 so as to extend in a longitudinal direction of the base 11 (hereinafter, referred to as X direction). The linear slider 12 has a ball screw mechanism having a motor (not shown) and a moving body 121 that is moved in the X direction by the operation of the ball screw mechanism. The linear slider 13 has a ball screw mechanism having a motor (not shown) and a moving body 131 that is moved in the X direction by the operation of the ball screw mechanism. In the linear sliders 12, 13, the ball screw mechanisms are operated synchronously and the moving bodies 121, 131 are moved in the X direction synchronously.

A linear slider 14 is arranged between the moving bodies 121, 131 so as to extend in a direction perpendicular to the X direction (hereinafter, referred to as Y direction). As the linear sliders 12, 13 are operated, the linear slider 14 is translated in the X direction. The linear slider 14 has a ball screw mechanism having a motor (not shown) and a moving body 141 that is moved along the Y direction by the operation of the ball screw mechanism.

The operation of each linear slider 12, 13, 14 is controlled by a control computer C.

As shown in FIG. 1(a), a support plate 15 is fixed to the moving body 141, and a support frame 16 is fixed to the support plate 15. A column 17 is provided to the support frame 16, and a placing plate 18 is fixed to the upper portion of the column 17. A motor 19 and a bobbin holder 20 are supported on the placing plate 18. A bobbin 21 having a fiber bundle F is mounted to the bobbin holder 20. The bobbin 21 is rotated in a direction letting out the fiber bundle F by the operation of the motor 19 (the direction shown by arrow R in FIG. 1(a)). The fiber bundle F is formed by a plurality of filaments (carbon fibers in this embodiment) that are bundled in a flat shape without being twisted. The motor 19 is controlled by the control computer C.

A column 22 is provided on the placing plate 18 and a pair of guide rollers 23, 24 are provided at the upper portion of the column 22. A tension roller 25 is provided below the guide rollers 23, 24 so as to move vertically. A guide roller 26 is provided at the lower portion of the column 22. The fiber bundle F let out from the bobbin 21 is guided to a position below the placing plate 18 by the guide rollers 23, 24, the tension roller 25 and the guide roller 26. An appropriate tensile force is applied to the fiber bundle F by a tensile force applying mechanism including the tension roller 25.

A motor 27 is fixed to the lower portion of the support frame 16. A screw shaft 271, which is an output shaft of the motor 27, extends vertically (in a Z direction). A support frame 28, which is a movable portion, is connected to the screw shaft 271 via a nut portion 29. The screw shaft 271 is screwed to the nut portion 29, and the support frame 28 moves in the Z direction when the motor 27 is actuated. The operation of the motor 27 is controlled by the control computer C.

An arrangement head 30 is provided at the lower portion of the support frame 28. The arrangement head 30 has a guide pipe 31, which is formed in a straight line and lets out the fiber bundle F. As shown in FIG. 5(b), a guide hole 311 in the guide pipe 31 is formed in an elongated shape and the guide pipe 31 lets out the fiber bundle F in a flat state from the guide hole 311.

As shown in FIG. 1(a), guide rollers 32, 33 are provided to the support frame 28. The fiber bundle F that is guided from the guide roller 26 is introduced into the guide pipe 31 via the guide rollers 32, 33.

Figure 3:
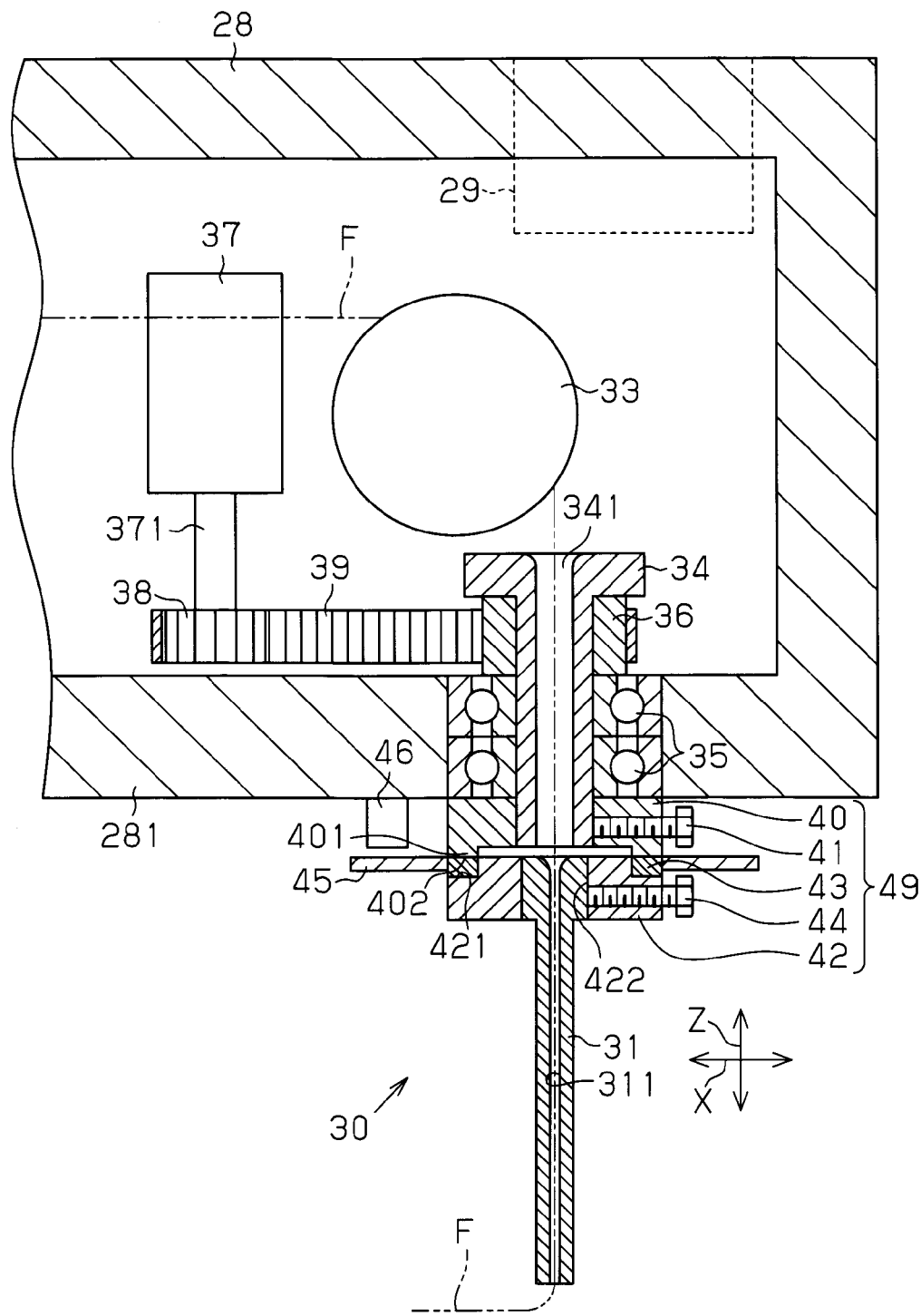
FIG. 3 is a partially enlarged cross-sectional view of FIG. 1(a)

As shown in FIGS. 1(b) and 3, an introduction pipe 34 of the arrangement head 30 is rotatably supported on a lower wall 281 of the support frame 28 via radial bearings 35. The introduction pipe 34, which is a movable portion, extends through the lower wall 281 in the Z direction and an introduction hole 341 of the introduction pipe 34 extends in the Z direction. The introduction pipe 34 has a circular transverse cross-sectional shape. A timing pulley 36 is fixed to a protruded end portion of the introduction pipe 34, which is protruded upwardly from the lower wall 281.

As shown in FIGS. 3 and 2(b), a motor 37 is attached to the support frame 28 and a timing pulley 38 is fixed to an output shaft 371 of the motor 37. A timing belt 39 is wound around the timing pulley 38 and the timing pulley 36. When the motor 37 is activated, the introduction pipe 34 is rotated. The motor 37, the timing pulleys 36, 38 and the timing belt 39 form a rotation driving mechanism that rotates the introduction pipe 34.

A magnetic cylinder 40 is fitted to the protruded end of the introduction pipe 34 that is protruded downwardly from the lower wall 281. The cylinder 40 is fixed to the introduction pipe 34 by a screw 41 that is screwed to a peripheral wall of the cylinder 40 so as to contact a peripheral surface of the introduction pipe 34. An annular connection projection 401 is integrally formed with the lower surface of the cylinder 40. A disk 42 is connected to the connection projection 401 with an annular permanent magnet 43. An annular recess 421 is formed on an upper surface of the disk 42. The annular permanent magnet 43 is fitted to the recess 421 so as to be fixed by an adhesive agent for example. The permanent magnet 43 contacts the distal end surface 402 of the magnetic connection projection 401 with their surfaces and the permanent magnet 43 and the connection projection 401 are connected to each other by a magnetic force. The distal end surface 402 of the connection projection 401 that is a connecting surface of the cylinder 40 with respect to the permanent magnet 43 is a plane surface that is perpendicular to the Z direction.

A fitting hole 422 is formed at a center of the disk 42, and the guide pipe 31 is fitted to the fitting hole 422. The disk 42 is fixed to the guide pipe 31 by a fixing screw 44 that is screwed to a peripheral wall of the disk 42 so as to contact the peripheral surface of the guide pipe 31. The cylinder 40, the permanent magnet 43, the disk 42 and the fixing screws 41, 44 form the connection portion 49 that can be separated into two parts. The guide pipe 31 is connected to the support frame 28, which is a movable portion, with the connection portion 49.

A guide hole 311 of the guide pipe 31 extends in the Z direction. A central axis L1 of the guide hole 311 (shown in FIGS. 1(b) and 4) and a central axis L2 of the introduction hole 341 of the introduction pipe 34 (shown in FIGS. 1(b) and 4) are aligned with each other. That is, the guide pipe 31 and the introduction pipe 34, which each are formed in a straight line, are connected to each other in series by the connection portion 49. The longitudinal direction of the guide pipe 31 (a direction of the central axis L1) is perpendicular (Z direction) to the direction in which the guide pipe 31 is translated. The fiber bundle F, which is guided by the guide roller 33, is introduced into the introduction hole 341 and the guide hole 311.

A ring 45, which is a ring portion, is fitted and fixed to an outer peripheral surface of the permanent magnet 43. A photoelectric sensor 46 of a reflection type is provided on a lower wall 281 of the support frame 28. A detection zone of the photoelectric sensor 46 is set to the position of the ring 45 when the connection portion 49 is not separated. In a state where the permanent magnet 43 is connected to the distal end surface of the connection projection 401 by a magnetic force, the path of light emitted from the photoelectric sensor 46 crosses the ring 45, and light emitted from the photoelectric sensor 46 is reflected by the ring 45 and received by the photoelectric sensor 46. In a state where the permanent magnet 43 is not connected to the distal end surface of the connection projection 401, the light emitted from the photoelectric sensor 46 is not received by the photoelectric sensor 46. Information relating to whether light has been received by the photoelectric sensor 46 is sent to the control computer C.

As shown in FIG. 2(a), a frame body 47 is placed on the base 11. The frame body 47 is formed in a rectangular shape, and pins 48 are arranged on the upper surface of the frame body 47 along the frame body 47 with a predetermined pitch (for example, a pitch of several millimeters). The guide pipe 31 shown in FIG. 1(a) is positioned at an appropriate height by the operation of the motor 27 and is moved in the X direction, the Y direction, or a bias direction (in a diagonal direction) according to the combination of the operation of the linear sliders 12, 13 and the linear slider 14. As the guide pipe 31 is moved in the X direction, the Y direction, or the bias direction, the fiber bundle F, which is transported in the guide pipe 31, is hooked on the pins 48 and drawn from the guide pipe 31. FIG. 5(a) shows an example in which the fiber bundle F is hooked on the pins 48 and arranged.

The linear sliders 12, 13, 14 form a moving device that translates the guide pipe 31 in the X direction, the Y direction, or the bias direction.

Except when the guide pipe 31 is turned around the pin 48 such that the fiber bundle F is hooked on the pin 48, the direction of the guide pipe 31 is controlled by the operation of the motor 37 such that the flat surface of the fiber bundle F that is led out from the guide pipe 31 faces the linear moving direction of the guide pipe 31. In the state shown in FIG. 5(a), the flat surface of the fiber bundle F that is led out from the guide pipe 31 faces the Y direction.

If the guide pipe 31 is hooked on the arranged fiber bundle F, or if the guide pipe 31 contacts the pin 48, or if an extraordinary tension is applied to the fiber bundle F that is led out from the guide pipe 31, an extraordinary load in the lateral direction is applied to the guide pipe 31. This cancels the magnetic connection between the permanent magnet 43 and the cylinder 40, and the disk 42 is dropped off the cylinder 40. If the disk 42 is dropped off the cylinder 40, the photoelectric sensor 46 does not receive the emission light, and the information that the photoelectric sensor 46 does not receive the emission light is sent to the control computer C. The control computer C stops the operations of the linear sliders 12, 13, 14 and the motors 19, 27, 37 based on the input of the information of no emission light. In other words, the control computer C stops the operation of the fiber bundle arranging apparatus 10.

The photoelectric sensor 46 is a separation discriminating sensor that discriminates the connection state in which the permanent magnet 43 and the cylinder 40 are connected to each other from the separation state in which the permanent magnet 43 and the cylinder 40 are separated from each other.

The first embodiment has following advantages.

(1) If an extraordinary load is applied laterally to the guide pipe 31, the connection portion 49 is separated into two parts at the connecting part between the cylinder 40 and the permanent magnet 43, and the guide pipe 31 is separated from the introduction pipe 34. This prevents the guide pipe 31 from being damaged, and the guide pipe 31 can be reused.

(2) The permanent magnet 43, which is connected to the cylinder 40 by a magnetic force, is formed in an annular shape that surrounds the central axis L1 of the guide pipe 31. Therefore, even if an extraordinary load is applied laterally to the guide pipe 31 from any direction within 360 degrees, the connection portion 49 is reliably separated.

(3) When the connection portion 49 is separated, the arrangement of the fiber bundle can be restarted without replacing the guide pipe 31 by connecting the permanent magnet 43 to the cylinder 40 again. The connection portion 49 using the permanent magnet 43 can be reused repeatedly after its separation.

(4) The fiber bundle arranging apparatus 10 has the photoelectric sensor 46 as the separation discriminating sensor. Therefore, when the connection portion 49 is separated, the operation of the fiber bundle arranging apparatus 10 is stopped, so that imperfect formation of a fiber bundle layer is prevented.

(5) In view of the material property of the three-dimensional fiber structure, it is desirable that the fiber bundle F be arranged in a flat state. Therefore, the flat surface of the fiber bundle F is required to face in the moving direction of the guide pipe 31. In the structure where the introduction pipe 34 is rotated, the flat surface of the fiber bundle F can be caused to face in the moving direction of the guide pipe 31. Regardless of the direction in 360 degrees in which the guide pipe 31 moves, the connection portion 49 is separated and the guide pipe 31 is reliably separated from the introduction pipe 34 if the flat surface of the fiber bundle F can be caused to face in the moving direction of the guide pipe 31 and an extraordinary load is laterally applied to the guide pipe 31.

(6) High accuracy is required for forming the guide hole 311 of the guide pipe 31 to arrange the fiber bundle F in a flat state. However, since the introduction hole 341 of the introduction pipe 34 only introduces the fiber bundle F to the guide hole 311, high accuracy is not required for forming the introduction hole 341 of the introduction pipe 34. Therefore, the manufacturing cost of the introduction pipe 34 is lower than that of the guide pipe 31. The diameter of the introduction hole 341, of which the transverse cross section is a circle, is appropriately enlarged to be greater than the diameter of the guide hole 311 of the guide pipe 31. The larger the diameter of the introduction hole 341, the smaller the passage resistance when the fiber bundle F passes through the introduction pipe 34 becomes. The diameter of the introduction hole 341 of the introduction pipe 34 is made greater than the diameter of the guide hole 311 of the guide pipe 31. This structure is preferable for feeding the fiber bundle F smoothly.

Next, a second embodiment of the present invention will be described with reference to FIGS. 6(a) and 6(b). The same reference numerals are given to those components that are the same as the corresponding components of the first embodiment.

Figure 6A:
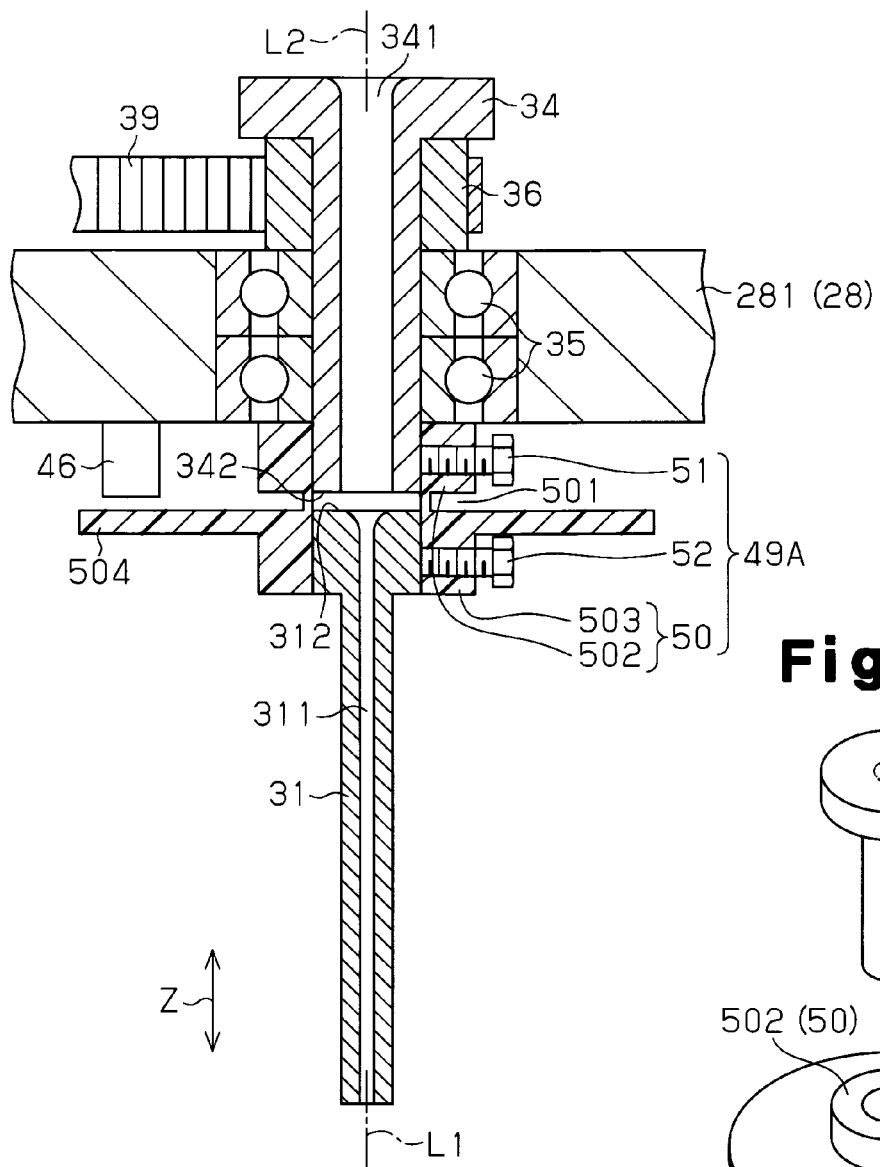
FIG. 6 (a) is a partially enlarged cross-sectional view showing a fiber bundle arranging apparatus according to a second embodiment of the present invention.
FIG. 6(b) is an exploded perspective view showing the arrangement head of FIG. 6(a)
Figure 6B:
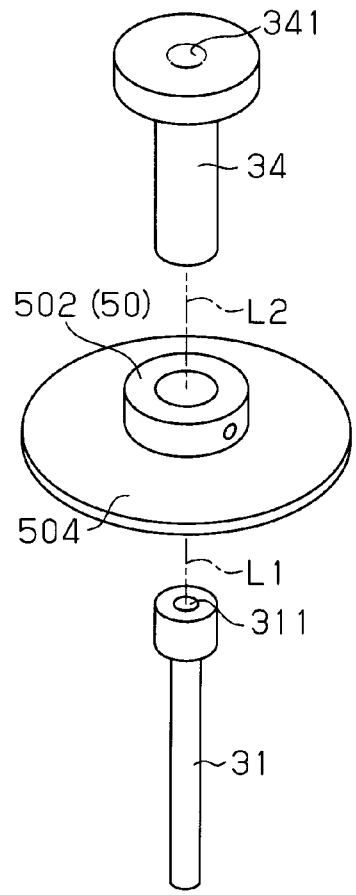

As shown in FIG. 6(a), a connection cylinder 50 made of a synthetic resin, for example, acrylic resin, is fitted to a protruded end portion of the introduction pipe 34, which is protruded downwardly from the lower wall 281. The protruded end portion of the introduction pipe 34 is fitted to the connection cylinder 50. The connection cylinder 50 is fixed to the introduction pipe 34 by a screw 51 that is screwed into the peripheral wall of the connection cylinder 50 so as to contact the peripheral surface of the introduction pipe 34. In other words, one end of the connection cylinder 50 is connected to the support frame 28 so as not to be detached.

A proximal end portion of the guide pipe 31 is fitted to the connection cylinder 50. The guide pipe 31 is fixed to the connection cylinder 50 by a screw 52, which is screwed to the peripheral wall of the connection cylinder 50 so as to contact the peripheral surface of the guide pipe 31. The guide hole 311 of the guide pipe 31 extends in the Z direction. The central axis L1 of the guide hole 311 (shown in FIG. 6(b)) and the central axis L2 of the introduction hole 341 of the introduction pipe 34 (shown in FIG. 6(b)) are aligned with each other. In other words, the guide pipe 31 and the introduction pipe 34, which are formed in a straight line, are connected in series via the connection cylinder 50.

A distal end 342 of the introduction pipe 34 is spaced from the proximal end 312 of the guide pipe 31 at an axially middle portion of the connection cylinder 50. An annular slit 501 is formed on the outer peripheral surface of the connection cylinder 50 so as to extend over the circumference of the connection cylinder 50 at an axially middle portion. The annular slit 501 is formed to surround a space between the distal end 342 of the introduction pipe 34 and the proximal end 312 of the guide pipe 31. The annular slit 501 defines a fitting portion 502, which is fitted to the introduction pipe 34, and a fitting portion 503, which is fitted to the guide pipe 31. If an extraordinary load is laterally applied to the guide pipe 31, the connection cylinder 50 is separated into the fitting portion 502 and the fitting portion 503 at the position of the annular slit 501, and the fitting portion 503 is dropped off the fitting portion 502. The annular slit 501 determines the separation position of the connection cylinder 50. The connection cylinder 50 and the screws 51, 52 form the connection portion 49A that can be separated into two parts.

A flange 504, which is a ring portion, is integrally formed on the outer peripheral surface of the fitting portion 503. A photoelectric sensor 46 of a reflection type is attached to the lower wall 281 of the support frame 28. The detection zone of the photoelectric sensor 46 is set to the position of the flange 504 when the connection portion 49A is not separated into the two parts. When the connection cylinder 50 is not separated, the light emitted from the photoelectric sensor 46 is reflected by the flange 504 to be received by the photoelectric sensor 46. When the connection cylinder 50 is separated, the light emitted from the photoelectric sensor 46 is not received by the photoelectric sensor 46.

The second embodiment provides the same advantages as the advantages (1), (2), (4) to (6) of the first embodiment.

Next, a third embodiment of the present invention will be described with reference to FIGS. 7(a) and 7(b). The same reference numerals are given to those components that are the same as the corresponding components of the first embodiment.

As shown in FIG. 7(a), a cylinder 53 is fitted to the protruded end portion of the introduction pipe 34, which is protruded downwardly from the lower wall 281. The protruded end portion of the introduction pipe 34 is fitted to the cylinder 53. The cylinder 53 is fixed to the introduction pipe 34 by a screw 54, which is screwed to the peripheral wall of the cylinder 53 so as to contact the peripheral surface of the introduction pipe 34. An annular engagement projection 531 is formed on the outer peripheral surface of the cylinder 53 so as to extend over the entire circumference of the cylinder 53. A cylinder 55 made of a synthetic resin is connected to the cylinder 53.

As shown in FIG. 7(b), a plurality of engagement projections 551 are integrally formed on the cylinder 55. The engagement projections 551 are arranged along the circumferential direction of the cylinder 55 with a predetermined distance therebetween. The engagement projections 551 are engaged with the engagement projection 531 to connect the cylinder 55 and the cylinder 53.

As shown in FIG. 7(a), when the engagement projections 551 are engaged with the engagement projection 531, the end surface of the cylinder 53 and the end surface of the cylinder 55 contact each other. The proximal end portion of the guide pipe 31 is fitted to the cylinder 55. The guide pipe 31 is fixed to the cylinder 55 by a screw 56, which is screwed to the peripheral wall of the cylinder 55 so as to contacted the peripheral surface of the guide pipe 31. The guide hole 311 of the guide pipe 31 extends in the Z direction. The central axis L1 of the guide hole 311 and the central axis L2 of the introduction pipe 34 are aligned with each other. In other words, the guide pipe 31 and the introduction pipe 34, which are formed in a straight line, are connected to each other in series with the cylinders 53, 55.

If an extraordinary load is laterally applied to the guide pipe 31, the engagement projection 531 and the engagement projections 551 are disengaged, and the cylinder 55 is dropped off the cylinder 53. The cylinders 53, 55 and the screws 54, 56 form the connection portion 57, which can be separated into two parts.

A flange 552 is integrally formed on the outer periphery surface of the cylinder 55. A photoelectric sensor 46 of a reflection type is attached to the lower wall 281 of the support frame 28. When the connection portion 57 is not separated, the light emitted from the photoelectric sensor 46 is reflected by the flange 552 and received by the photoelectric sensor 46. When the connection portion 57 is separated, the light emitted from the photoelectric sensor 46 is not received by the photoelectric sensor 46.

The third embodiment has the same advantages as the advantages (1), (2), (4) to (6) of the first embodiment. When the connection portion 57 is separated, the cylinder 53 is connected to the cylinder 55 again by engaging the engagement projections 551 with the engagement projection 531. Accordingly, the arrangement of the fiber bundle is restarted without replacing the guide pipe 31. The connection portion 57 using the engagement of the engagement projection 531 and the engagement projections 551 is repeatedly used even after being separated.

The present invention may be modified as follows.

In the first embodiment, the disk 42 may be formed of a magnetic material. Also, the permanent magnet 43 may be fixed to the cylinder 40 by, for example, an adhesive agent, and the permanent magnet 43 may be connected to the disk 42 by a magnetic force.

In the first embodiment, the ring 45 may be provided on the outer periphery of the disk 42, and the disk 42 may be formed by a magnetic material. In this case, the permanent magnet 43 is connected to the cylinder 40 by a magnetic force, and the permanent magnet 43 may be connected to the disk 42 by a magnetic force.

In the second embodiment, the connection cylinder 50 may be formed of metal, such as, aluminum.

In the first embodiment, the cylinder 40 may be connected to the disk 42 by an elastic force of a tension spring.

Other than the photoelectric sensor 46, a proximity sensor (a magnetic sensor, a capacitance type sensor), a limit switch, or an energization sensor may be used as the separation discriminating sensor.

The present invention may be applied to a fiber arranging apparatus having a structure in which the introduction pipe 34 is not rotated.

The guide hole 311 of the guide pipe 31 does not need to be flat.

The connection portions 49, 49A, 57 may be fixed to the guide pipe 31 or the introduction pipe 34 not by the screws 41, 44, 51, 52, 54, 56, but by other means such as an adhesive agent.

The invention claimed is:
1. A fiber bundle arranging apparatus comprising:
a guide pipe having a guide hole for passing a fiber bundle therethrough;
a moving device that moves the guide pipe, thereby arranging the fiber bundle while letting out the fiber bundle from the guide hole;
a movable portion that is moved by the moving device; and
a separable connection portion for connecting the guide pipe to the movable portion,
wherein the connection portion has a magnet that is fixed to one of the movable portion, and the guide pipe, and a magnetic body that is fixed to the other one of the mov- able portion and the guide pipe, wherein the magnetic body is connected to the magnet by a magnetic force, wherein the guide pipe is formed in a straight line, and the moving device translates the guide pipe in a direction that is perpendicular to a longitudinal direction of the guide pipe, wherein a connecting surface of the magnet and the magnet body is formed in an annular shape that surrounds an axis of the guide pipe, and wherein the connecting surface is a plane that is perpendicular to the longitudinal direction of the guide pipe.

2. The fiber arranging apparatus according to claim 1, further comprising a separation discriminating sensor that discriminates a separation state where the connection portion is separated from a connection state where the connection portion is not separated.

3. A fiber bundle arranging apparatus comprising:

a guide pipe having a guide hole for passing a fiber bundle therethrough;

a moving device that moves the guide pipe, thereby arranging the fiber bundle while letting out the fiber bundle from the guide hole;

a movable portion that is moved by the moving device; and a separable connection portion for connecting the guide pipe to the movable portion, wherein the connection portion is a connection cylinder that is formed in a cylindrical shape, and the connection cylinder has an annular slit that extends over the entire circumference of the connection cylinder at a middle portion in an axial direction of the connection cylinder, so as to define a separation position, wherein one of two ends of the connection cylinder in the axial direction is undetachably connected to the movable portion, and the other end of the connection cylinder in the axial direction is undetachably connected to the guide pipe.

4. A fiber bundle arranging apparatus comprising:

a guide pipe having a guide hole for passing a fiber bundle therethrough;

a moving device that moves the guide pipe, thereby arranging the fiber bundle while letting out the fiber bundle from the guide hole;

a movable portion that is moved by the moving device; and a separable connection portion for conneting the guide pipe to the movable portion, wherein the movable portion has an introduction pipe that introduces the fiber bundle to the guide pipe, the guide pipe being connected to the introduction pipe with the connection portion, wherein the guide pipe and the introduction pipe are formed in a straight line and connected to each other in series, and the introduction pipe is supported by the movable portion so as to rotate around its axis, wherein a transverse cross section of the guide hole of the guide pipe is formed in a flat shape so as to let out the fiber bundle in a flat shape, and wherein the introduction pipe is rotated by a rotation driving mechanism.

5. The fiber arranging apparatus according to claim 4, further comprising a separation discriminating sensor that discriminates a separation state, in which the connection portion is separated, from a connection state, in which the connection portion is not separated, wherein the guide pipe has a ring portion that is separated from the introduction pipe when the connection portion is separated, wherein the ring portion is arranged to be coaxial with the introduction pipe, and wherein a detection zone of the separation discriminating sensor is set to be a position of the ring portion when the connection portion is not separated.

6. The fiber arranging apparatus according to claim 4, wherein the introduction pipe has an introduction hole, a transverse cross section of the introduction hole of the introduction pipe has a circular shape, and the diameter of the introduction hole is greater than the diameter of the guide hole.

* * * * *